(12) United States Patent
Macours

(10) Patent No.: US 9,622,183 B2
(45) Date of Patent: Apr. 11, 2017

(54) MOBILE DEVICE

(71) Applicant: NXP B.V., Eindhoven (NL)

(72) Inventor: Christophe Macours, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/824,888

(22) Filed: Aug. 12, 2015

(65) Prior Publication Data

US 2016/0081018 A1   Mar. 17, 2016

(30) Foreign Application Priority Data

Sep. 16, 2014  (EP) .................................. 14184894

(51) Int. Cl.
| | |
|---|---|
| *H04M 1/00* | (2006.01) |
| *H04B 1/38* | (2015.01) |
| *H04W 52/02* | (2009.01) |
| *H04M 1/725* | (2006.01) |
| *H04M 1/60* | (2006.01) |
| *H04R 3/00* | (2006.01) |

(52) U.S. Cl.
CPC ....... *H04W 52/028* (2013.01); *H04M 1/6016* (2013.01); *H04M 1/72563* (2013.01); *H04W 52/0254* (2013.01); *H04M 2250/74* (2013.01); *H04R 3/00* (2013.01); *H04R 2400/01* (2013.01); *H04R 2499/11* (2013.01); *Y02B 60/50* (2013.01)

(58) Field of Classification Search
CPC ............ H04W 52/02; H04W 52/0229; H04W 52/0225; H04W 52/028; H04W 52/0254; H04M 1/72519; H04M 1/72522

USPC ...................................... 455/574, 90.1, 90.3
See application file for complete search history.

(56) References Cited

U.S. PATENT DOCUMENTS

| | | | |
|---|---|---|---|
| 2013/0080167 A1* | 3/2013 | Mozer | G10L 17/22 704/246 |
| 2013/0322215 A1 | 12/2013 | Du et al. | |
| 2014/0122078 A1 | 5/2014 | Joshi et al. | |
| 2014/0140560 A1 | 5/2014 | Melanson et al. | |
| 2014/0254829 A1* | 9/2014 | Wang | H04R 3/12 381/105 |
| 2014/0348336 A1* | 11/2014 | Tong | H04R 29/001 381/59 |

FOREIGN PATENT DOCUMENTS

| | | |
|---|---|---|
| EP | 1 044 558 B1 | 11/2003 |
| EP | 2 387 251 B1 | 5/2010 |
| EP | 2 639 793 A1 | 9/2013 |
| WO | 85/42745 | 9/1985 |

OTHER PUBLICATIONS

Extended European Search Report for Application 14184894.5 (Mar. 2, 2015).

* cited by examiner

*Primary Examiner* — Nhan Le

(57) ABSTRACT

Mobile devices such as mobile phones have always-on modes using sensors which respond to changes in the environment. A mobile device is described comprising a loudspeaker; a controller having an input coupled to the loudspeaker. The controller is operable in a first mode of operation to detect an electrical signal generated by the loudspeaker in response to an acoustic input signal. This signal can be used to activate further circuitry. Using a loudspeaker as an acoustic sensor may reduce the power consumption of the mobile device.

17 Claims, 6 Drawing Sheets

MOBILE DEVICE

CROSS-REFERENCE TO RELATED APPLICATIONS

This application claims the priority under 35 U.S.C. §119 of European patent application no. 14184894.5, filed Sep. 16, 2015 the contents of which are incorporated by reference herein.

This invention relates to a mobile device having a first mode of operation and a further mode of operation.

Mobile devices such as mobile phones, ultrabooks, tablet PCs typically have "always-on" functions which continuously sense the environment. When an appropriate environmental change is detected, the always on function is triggered to perform actions such as device wake-up, and voice keyword detection. These "always-on" functions have very low power requirements, typically lower than 1 milliwatts. These functions are typically implemented using sensors and low power hardware components such as integrated circuits which function independently from the high power main or system processor.

In case of voice activation in a mobile phone the main processor may be only woken up if a dedicated keyword is recognized. A multi-stage activation is usually applied. The mobile device 100 shown in FIG. 1 has an audio level monitoring circuit 10 connected to a digital signal processor (DSP) 18 which implements a voice activity detector 12 and keyword detector 14 as algorithms running on the DSP 18.

The microphone 16 is typically an analog or digital MEMS microphone or an electret condenser microphone connected to a power supply 20. In a first stage if an acoustic input sensed by the microphone includes non-stationary sound components, this may indicate a potential voice command to activate the mobile phone. In this case the audio level monitoring circuit 10 generates an activation signal which typically may be an interrupt request. This interrupt request activates the second stage by enabling the voice activity detector 12. If the acoustic input is determined to be speech by the voice activity detector 12, then a third stage is activated whereby the voice activity detector 12 enables or activates the keyword detector 14. As voice activity detector 12 and keyword detector 14 are implemented on a DSP then the activation signal for the third stage can be a software interrupt. If a keyword is detected by keyword detector 14 the digital signal processor 18 may generate a hardware interrupt request to a main processor (not shown). The interrupt request from the digital signal processor 18 may then wake up the main processor. A multistage power activation minimizes power consumption, however because of the always-on requirement, the first stage always consumes some power.

Various aspects of the invention are defined in the accompanying claims. In a first aspect there is defined a method of operation of a mobile device having a first mode of operation and a further mode of operation, the mobile device comprising a loudspeaker, the method comprising in the first mode of operation detecting an electrical signal generated by the loudspeaker in response to an acoustic stimulus, generating an activation signal in response to the detected acoustic input, and enabling the further mode of operation in response to the activation signal.

The loudspeaker of the mobile device may generate a detectable electrical response to an acoustic stimulus such as speech or clapping or some other audio impulse. Since the loudspeaker does not require a power supply, the power consumption of the first always-on stage of a multi-stage activation sequence may be reduced.

In embodiments enabling the further mode of operation may comprise activating a system processor in response to the activation signal.

In embodiments, enabling the further mode of operation may comprise activating a digital processor in response to the activation signal.

In embodiments, enabling the further mode of operation may comprise enabling a microphone in response to the activation signal.

In embodiments, enabling the further mode of operation may comprise detecting an electrical signal generated by the microphone in response to a further acoustic stimulus.

By using the loudspeaker to detect an initial acoustic input before activating the microphone, the power consumption of an always on sensing mode may be considerably reduced. This is because the microphone in a mobile device such as a mobile phone typically consumes 10 µA to 500 µA depending on the microphone type. In embodiments the first mode of operation may have a lower power consumption than the further mode of operation whereas the loudspeaker may consume no power unless driven by an amplifier.

In embodiments, the first mode of operation is a standby mode and wherein the power consumption of the standby mode is less than 1 mW.

Embodiments may be include a method of voice activation of mobile devices.

In a second aspect there is described a mobile device having a first mode of operation and a further mode of operation, the mobile device comprising: a loudspeaker; a controller having an input coupled to the loudspeaker; wherein the controller is operable in a first mode of operation to detect an electrical signal generated by the loudspeaker in response to an acoustic input signal, and to generate an activation signal in response to the detected acoustic input; and wherein the mobile device is operable to enable a further mode of operation in response to the activation signal.

In embodiments, the mobile device comprises an audio amplifier switchably coupled to the loudspeaker and wherein the controller is switchably coupled to the loudspeaker, wherein the controller is coupled to the loudspeaker in the first mode of operation and the audio amplifier is coupled to the loud speaker in the further mode of operation.

In embodiments the controller further comprises a first level detector having a first response time and a second level detector having a second different response time; wherein of the inputs of the first level detector and the second level detector are coupled to the loudspeaker in the first mode of operation, and the respective outputs of the first level detector and the second level detector are coupled to respective inputs of a comparator and the comparator output is coupled to the output of the detector and wherein the controller is operable to generate an activation signal in response to a non-stationary sound source.

In embodiments, the mobile device may comprise a microphone switchably coupled to a power supply and wherein the controller is configured to enable the microphone in response to the activation signal.

In embodiments, the mobile device may comprise a codec coupled to the microphone and the controller and wherein the controller is operable to enable the codec in response to the activation signal and wherein the codec is operable to generate a further activation signal in response to the activation signal.

The codec may be an audio codec implemented on a digital signal processor.

In embodiments, the mobile device may further comprise a system processor and wherein the controller is operable to enable the system processor in response to the further activation signal.

A mobile device may be one of a mobile phone, a laptop computer, a tablet computer and an mp3 player.

BRIEF DESCRIPTION OF THE DRAWINGS

In the figures and description like reference numerals refer to like features Embodiments of the invention are now described in detail, by way of example only, illustrated by the accompanying drawings in which.

DETAILED DESCRIPTION

Figure 1:
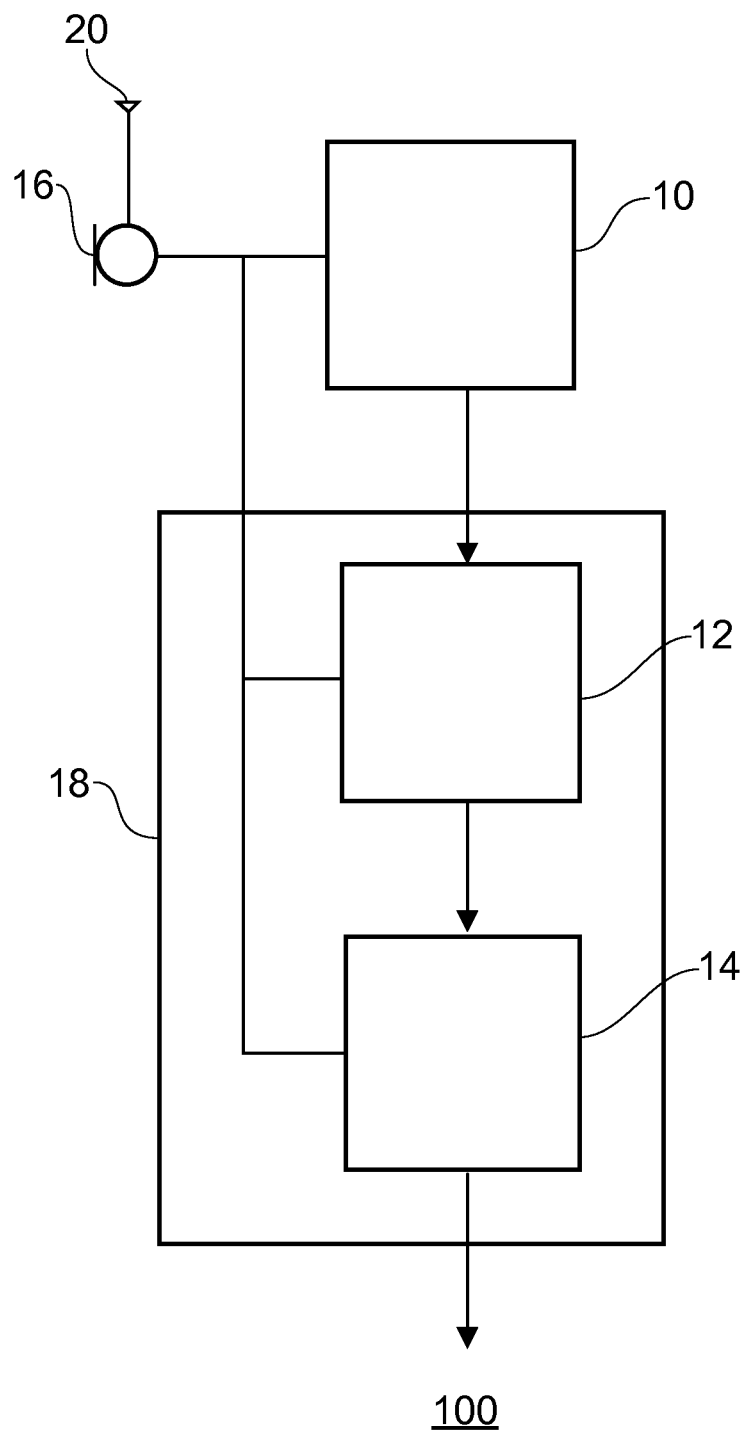
FIG. 1 Shows a known method of operation of a mobile device.
Figure 2:
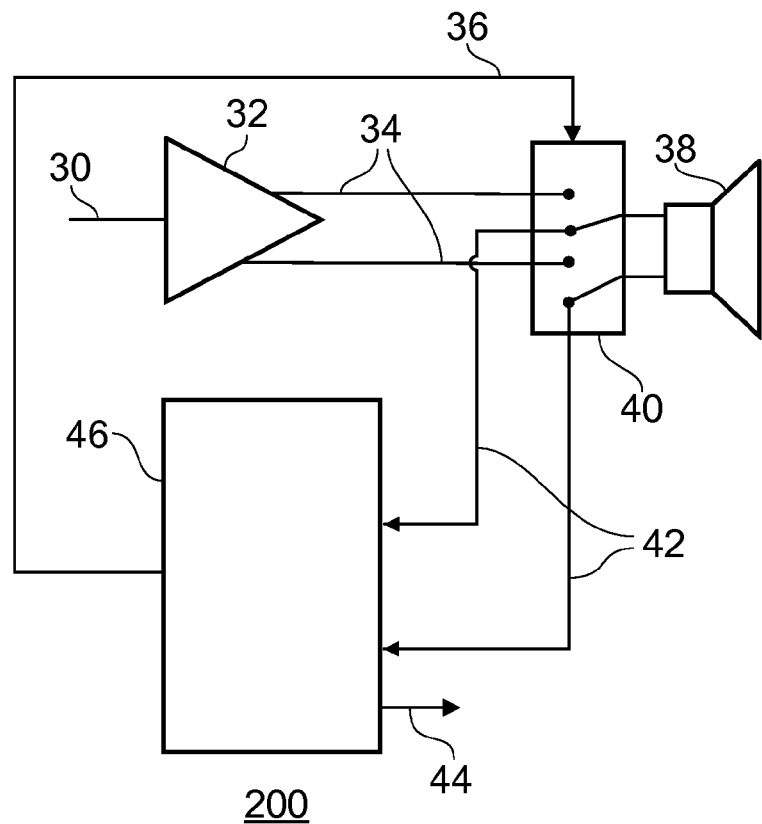
FIG. 2 Illustrates a mobile device according to an embodiment.

FIG. 2 illustrates a mobile device 200. Audio amplifier 32 may have an audio input 30 and an audio output 34 which may be a differential output. Audio amplifier 32 may be a class D amplifier. The audio output 34 may be connected to a loudspeaker 38 via a signal router 40 which is controlled by a control input 36. A controller 46, may have an input 42 which may be a differential input. Controller input 42 may be connected to a loudspeaker 38 via the signal router 40 which may route a signal between the loudspeaker 38 and the audio output 34 or the controller input 42. The signal router may for example be a multiplexer, de-multiplexer or switch. The controller 46 may have a controller activation output 44. The controller 46 may be connected to the control input 36 of the signal router 40.

In operation, the mobile device 200 may be in a first mode of operation in which the controller inputs 42 are connected to the loudspeaker 38 by the signal router 40. The speaker amplifier 32 may be disconnected from the loudspeaker 38 by the signal router 40.

In the first mode of operation, the controller 46 may be powered up. In the first mode of operation of the mobile device 200, other circuitry such as the amplifier 32 and a system processor (not shown) may be powered down. In examples of mobile devices, the loudspeaker 38 may be for example a receiver speaker in a mobile phone or a hands-free speaker in a mobile phone. The loudspeaker 38 may generate an electrical signal in response to an acoustic stimulus. The acoustic stimulus may be for example speech or clapping or some other audio stimulus. The electrical signal generated by the loudspeaker 38 may be detected by the controller 46. The controller 46 may generate an activation signal on the controller activation output 44 in response to the electrical signal received on the controller input 42. The controller 46 may include for example a comparator in which a comparison is made between the detected electrical signal and a predetermined threshold value.

The activation signal generated may enable or activate one or more further circuits such as a digital signal processor (not shown) of the mobile device 200. Following the activation of further circuits, the mobile device 200 may be configured in a second mode of operation. In the second mode of operation, the amplifier 32 may be connected to the loudspeaker via the signal router 40. In the normal operating mode, the controller inputs 42 may be disconnected from the loudspeaker 38. The controller 46 may disconnect the controller inputs 42 from the loudspeaker 38 once an activation signal is generated on the controller activation output 44.

In the first operating mode, the loudspeaker 38 may not require a power supply. In contrast, to function correctly, a microphone in a mobile device may need to be enabled and may consume current rating typically from 10 μA to 500 μA depending on the microphone type. Consequently an always-on function can be implemented which consumes much less power, for example less than 1 μA. For a mobile device such as a mobile phone, a first mode of operation may be a standby mode. A second mode of operation may be a normal operating mode whereby, for example phone calls can be made or received. Alternatively in a smart phone, a mode of operation may be any mode in which the display screen is active. For a mobile device such as a mobile audience music player, a first mode of operation may be a standby mode. A normal operating mode may be a mode in which audio may be output through the loudspeaker 38.

In some examples of the mobile device, the audio amplifier may be powered down in a first mode of operation and only powered up in a second mode of operation. In this case, the signal router 40 may be omitted. The skilled person will appreciate that the signal router 40 may be implemented for example as a multiplexor using transistors such as MOS transistors. The controller 46 may be implemented in hardware, or a combination of hardware and software. The hardware may include analog and digital circuits.

Figure 3:
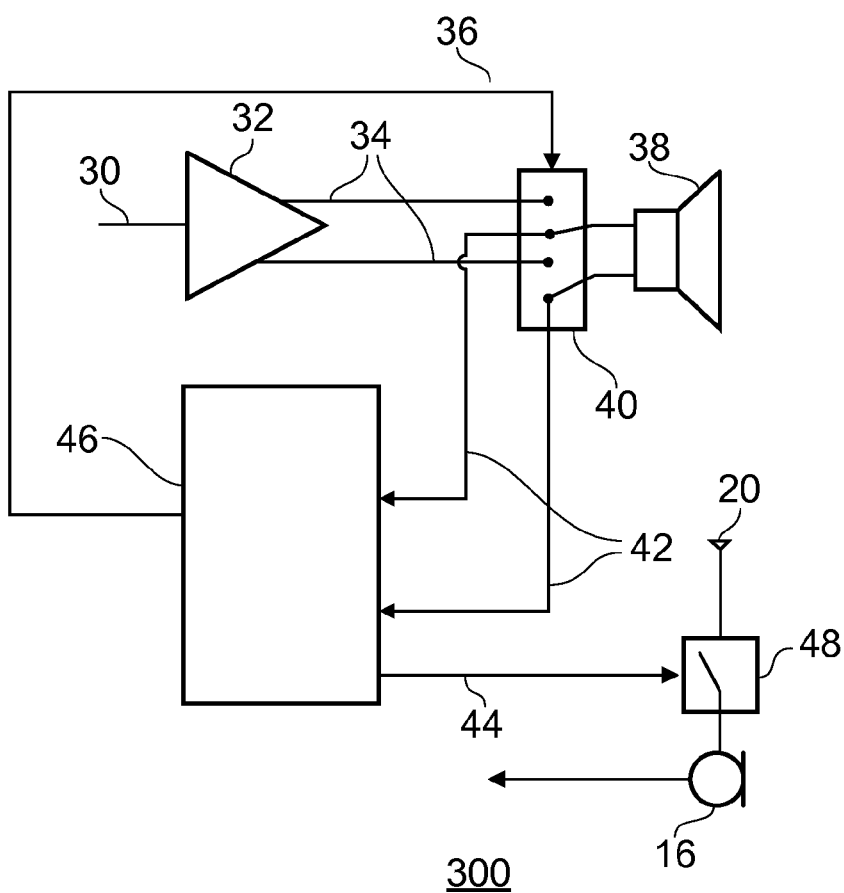
FIG. 3 Shows a mobile device according to an embodiment.

FIG. 3 illustrates a mobile device 300. The mobile device 300 may have a microphone 16, and loudspeaker 38. Audio amplifier 32 may have an audio input 30 and an audio output 34 which may be a differential input. Audio amplifier 32 may be a class D amplifier. The audio output 34 may be connected to a loudspeaker 38 via a signal router 40 which is controlled by a control input 36. A controller 46, may have an input 42 which may be a differential input. Controller input 42 may be connected to a loudspeaker 38 via the signal router 40. A controller 46 may be connected to the signal router control input 36. The controller 46 may have a controller activation output 44. Microphone 16 may be connected to a power supply 52 via a microphone enable switch 48. The controller activation output 44 may be connected to a control input of the microphone enable switch 48. The skilled person will appreciate that for example the microphone enable switch 48 may be a MOS transistor having a gate connected to the controller activation output 44, one of the source and drain connected to the power supply 52, and the other of the source and drain connected to the supply input of the microphone 48. The microphone enable switch 48 may be integrated together with a microphone and connected to a microphone enable input.

In operation, the mobile device 300 may be in a first mode of operation in which the controller inputs 42 are connected to the loudspeaker 38 by the signal router 40. The speaker amplifier 32 may be disconnected from the loudspeaker 38 by the signal router 40. In the first mode of operation, the controller 46 may be powered up. In the first mode of operation of the mobile device 300, other circuitry such as the amplifier 32 and a system processor (not shown) may be powered down. The loudspeaker 38 may be for example a receiver speaker in a mobile phone or a hands-free speaker in a mobile phone. The loudspeaker 38 may generate an electrical signal in response to an acoustic stimulus. The acoustic stimulus may be for example speech or clapping or some other audio stimulus. This electrical signal may be detected by the controller 46. The controller 46 may generate an activation signal on the controller activation output 44 in response to the electrical signal received on the controller input 42. The activation signal on the controller activation output 44 may enable the microphone 16 by connecting it to the power supply 20 via the microphone enable switch 48. Once enabled, the microphone 16 may be used to detect further acoustic stimuli. Since the loudspeaker 38 may consume much less current than the microphone 48, a multistage activation may be implemented using progressively larger current consuming components. During the activation of the mobile device from a first mode of operation to a second mode of operation, the loudspeaker 38 may be used in a first activation stage and the microphone 16 may be used in a second activation stage. Alternatively, the loudspeaker 38 may be used in all activation stages.

Figure 4A:
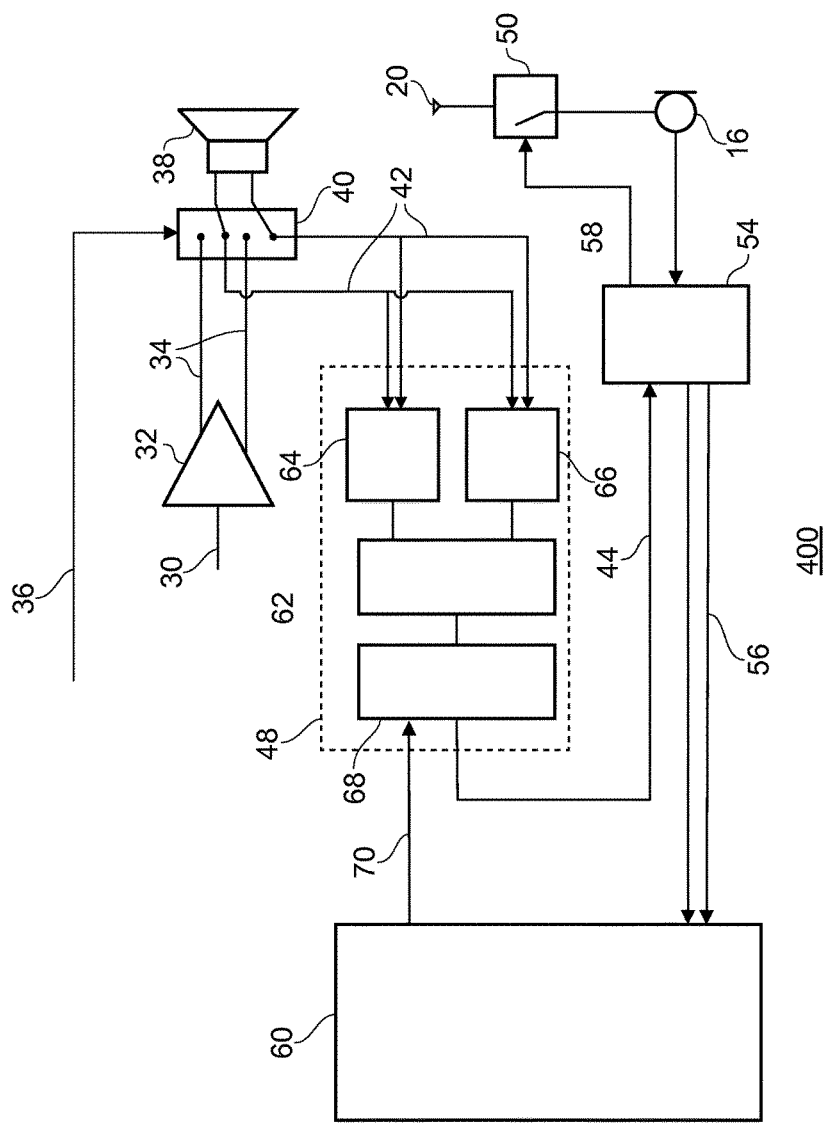
FIG. 4A illustrated a mobile device according to an embodiment.

FIG. 4a shows a mobile device 400. Audio amplifier 32 may have an audio input 30 and an audio output 34 which may be a differential output. Audio amplifier 32 may be a class D amplifier. The audio output 34 may be connected to a loudspeaker 38 via a signal router 40 which is controlled by a control input 36. A controller 48 which may be responsive to a non-stationary sound may have an input 42 which may be a differential input. The controller 48 may have a controller activation output 44. Controller input 42 may be connected to a loudspeaker 38 via the signal router 40 which may be controlled by a control input 36. The controller input 42 may be connected to a first level detector 64. The first level detector 64 may have a first time constant. The controller input 42 may be connected to a second level detector 66. The second level detector 66 may have a second different time constant. The time constant of the respective level detectors 64,66 may determine the response time of the level detector to an acoustic input. The first level detector may have a shorter time constant than the second level detector. An output of the first level detector may be connected to a first input of a comparator 62. An output of the second level detector 66 may be connected to a second input of the comparator 62. An output of the comparator may be connected to control logic 68. The control logic 68 may be connected to the controller activation output 44. The control logic 68 may be connected to the signal router control input 36. The controller activation output 44 may be connected to an input of a an audio codec 54. Audio codec 54 may be implemented by a programmable digital signal processor or a dedicated circuit. The control logic 68 may have a control input 70 connected to an output of the main processor 60. The control input 70 may control a reset function of the control logic 68 for example. Alternatively the control input 70 may also control programmable registers in the control logic 68.

System processor 60 which may be a microprocessor may have an output connected to the control input 36 of the signal router 40. System processor 60 may have an audio output connected to the input 30 of the amplifier 32. audio codec 54 may have an input connected to the microphone 16 and an output 58 connected to a control input of the microphone enable switch 48.

Figure 4B:
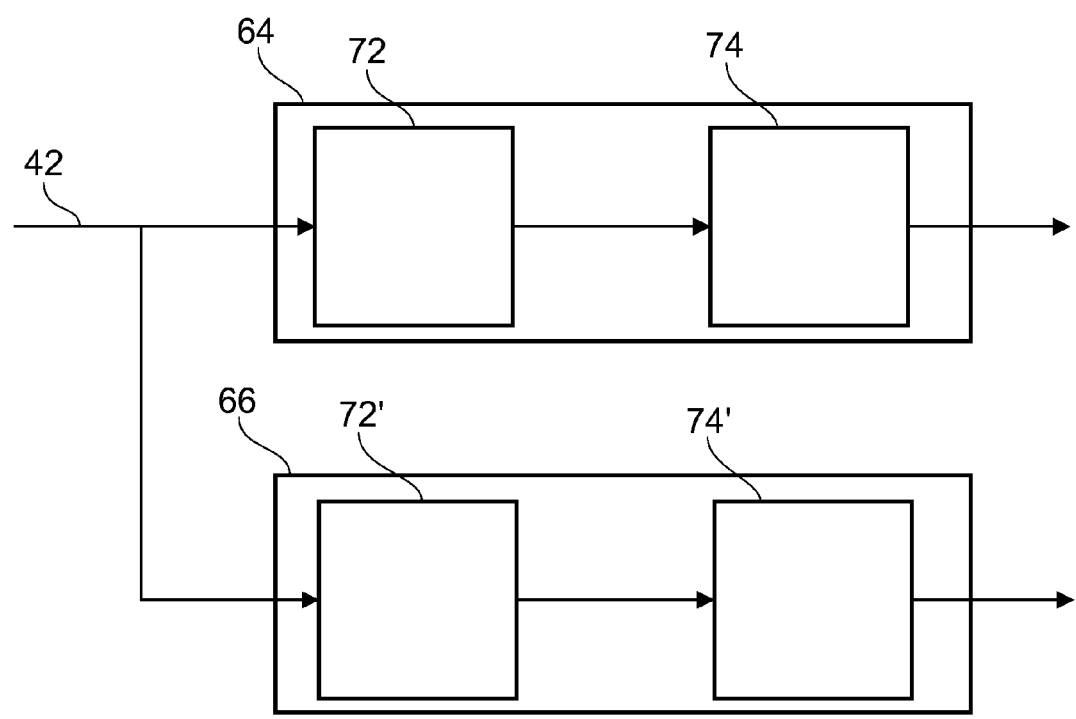
FIG. 4B shows an example level detector.

The first level detector 64 and the second level detector 66 may typically be implemented as a rectifier 72,72' connected to an integrator 74,74' as shown in FIG. 4B. The time constant of the integrator 74 may typically determine the response time of the first and second level detectors 64, 66. In operation, the mobile device 400 may be in a first mode of operation in which the controller inputs 42 are connected to the loudspeaker 38 by the signal router 40. The speaker amplifier 32 may be disconnected from the loudspeaker 38 by the signal router 40. In the first mode of operation, the controller 48 may be powered up. Controller 48 may always have power applied. In the first mode of operation of the mobile device 400, other circuitry such as the amplifier 32 and the system processor 60 may be powered down. The loudspeaker 38 may be for example a receiver speaker in a mobile phone or a hands-free speaker in a mobile phone. The loudspeaker 38 may generate an electrical signal in response to an acoustic stimulus. The acoustic stimulus may be for example speech or clapping or some other audio stimulus. This electrical signal may be detected by the controller 48. In operation of the controller 48, in the case of stationary noise input, the output of the first level detector 64 and the second level detector 66 may be comparable or approximately equal. In the case of non-stationary noise, the first level detector may react quicker than the second level detector and its output will be higher than that of the second level detector. Therefore, when the ratio between the first level detector output and the second level detector output is greater than a certain value, the audio input may be considered as being non-stationary. The comparator 62 output may change when a non-stationary signal is detected. The control logic 68 may generate an activation signal when the comparator output changes indicating that a non-stationary acoustic input has been detected. The control logic 68 may switch the signal router 36 to connect the loudspeaker 38 to the amplifier 32.

The activation signal on the controller activation output 44 may enable or activate the audio codec 54. The audio codec 54 may activate or enable the microphone 48. The microphone 16 may generate electrical signals in response to a further acoustic stimulus. The audio codec 54 may process the input signal received from the microphone 16 to determine whether the subsequent acoustic input signal is speech. Audio codec 54 may activate the system processor 60 for example by generating an interrupt on interrupt output 56. Once the system processor 60 is activated, the controller 48 may connect the loudspeaker 38 to the outputs of the audio amplifier 32 by controlling the signal router 40. The mobile device 400 may then be in a second mode of operation.

Figure 5:
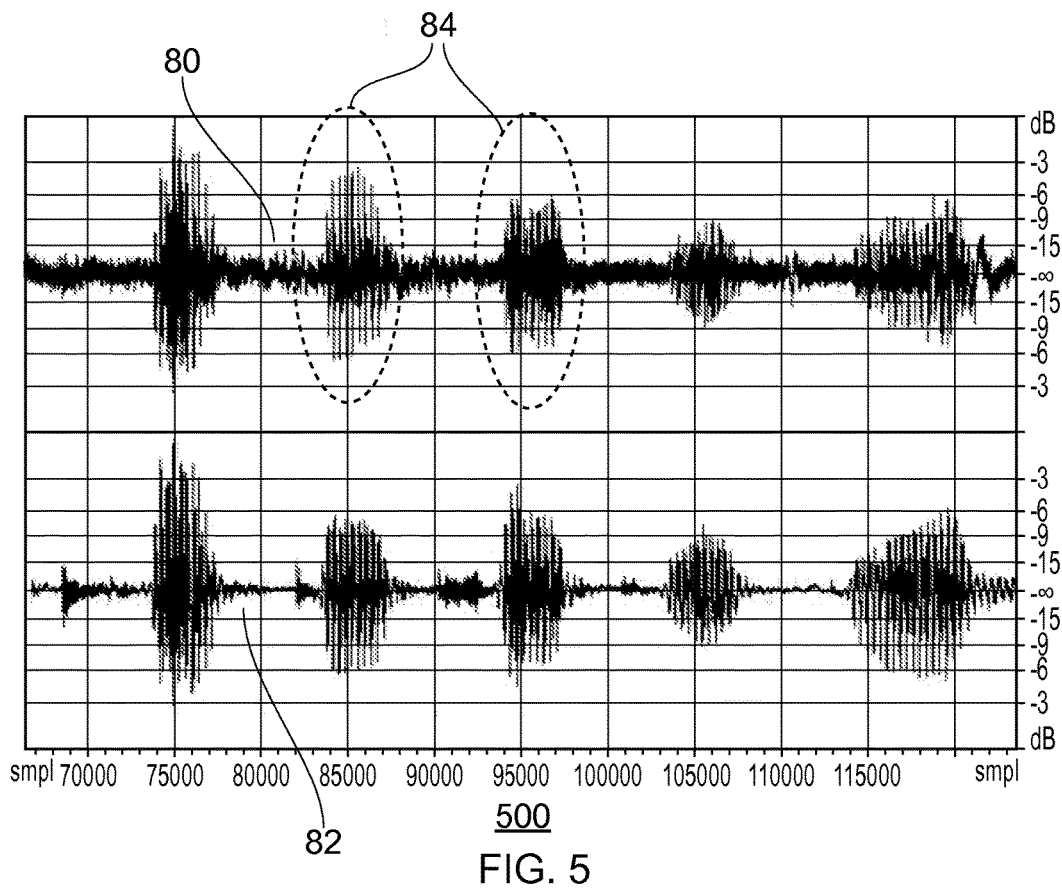
FIG. 5 illustrates an electrical signal generated by a microphone and a loudspeaker in response to an acoustic stimulus.

The first mode of operation may be a low power or standby mode. The second mode of operation may be a higher power mode of operation than the first mode FIG. 5 shows a graph 500 of the response of a loudspeaker 10 audio signal shown on the graph line 80. Graph 500 shows the response of a microphone to the same audio signal audio signal shown on the graph line 82. The x-axis is the sample number, and the y-axis shows the output in decibels. As can be clearly seen, the response of the loudspeaker 80 is noisier than the response of the microphone 82. However the non-stationary components 84 of the acoustic input generate a larger signal input on the input of the loudspeaker than the stationary components and so can be discriminated from the background noise.

Figure 6:
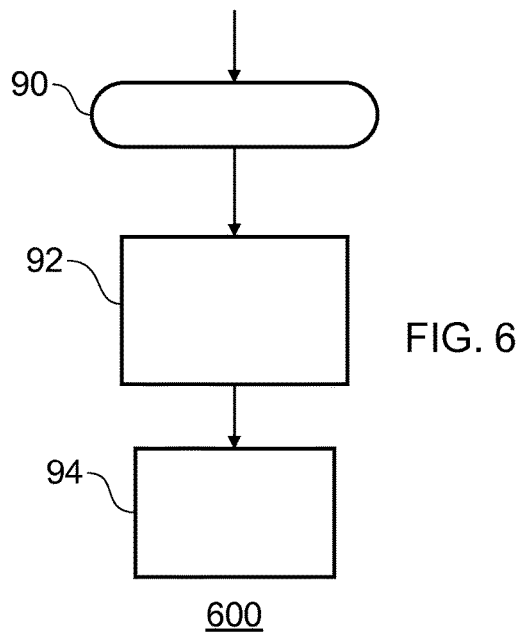
FIG. 6 Illustrates an example method of operation according to an embodiment.

FIG. 6 shows an example method of operation of the mobile device 600. In step 90 a mobile device may be in a low power always on mode. In this mode, many components of the mobile device will be disabled, such as the microphone and a system processor. In step 92 non-stationary sound components which may be speech may be detected using the loudspeaker. In step 94 an interrupt request may be generated from the response of the loudspeaker to an acoustic input having non-stationary sound components. This may be the first stage of a multistage activation process.

Figure 7:
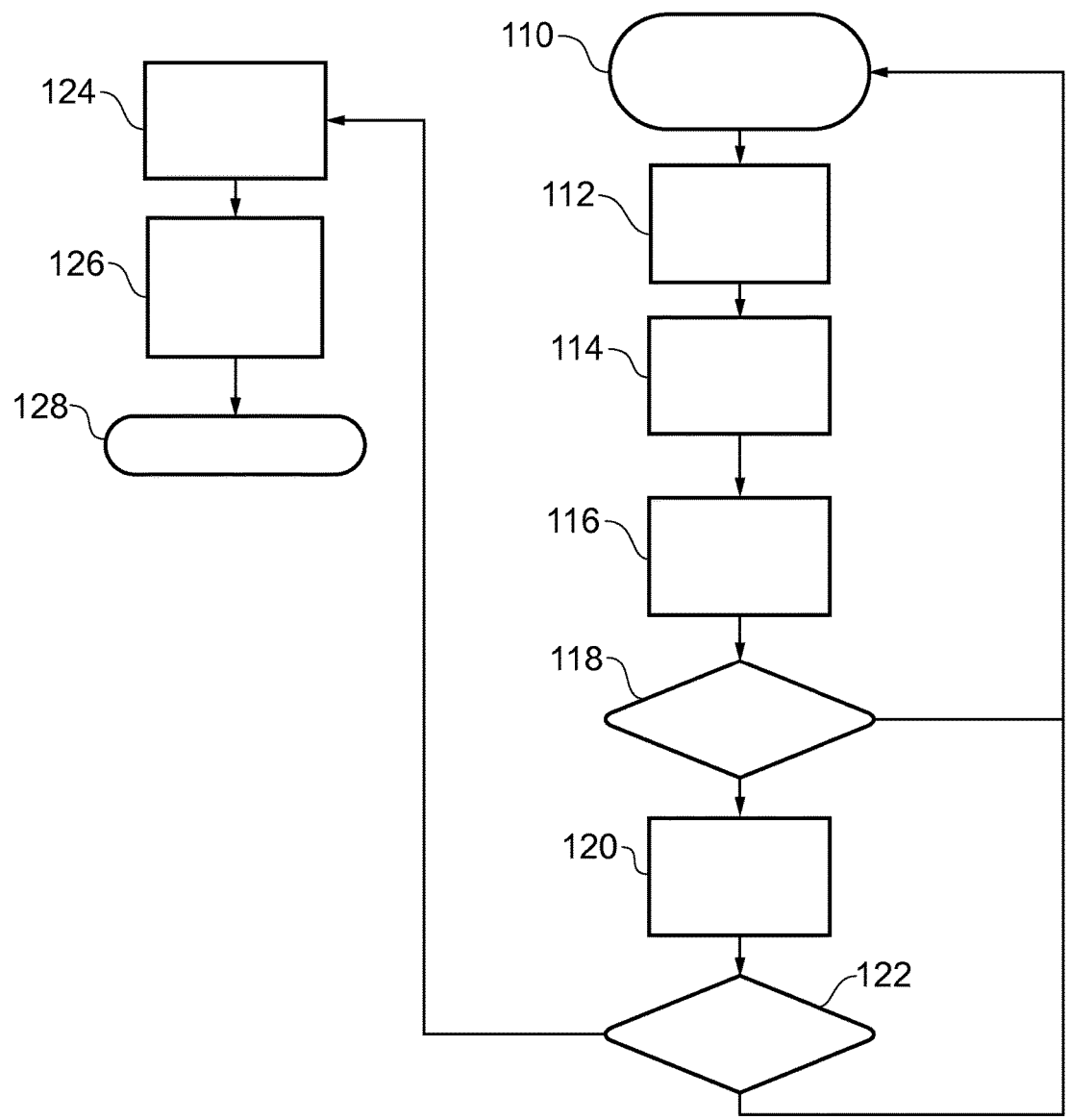
FIG. 7 shows a further example method of operation according to an embodiment.

FIG. 7 shows a method of voice activation of a mobile device 700. In step 110, a mobile device may be in a low power always on mode. In the always on mode a microphone may be disabled and an audio amplifier may be disabled. In step 112 non-stationary sound components in an acoustic input may be detected by the response of the loudspeaker to the acoustic input. If non-stationary sound components are detected then in step 114 an activation signal, which may be an interrupt request, may be generated indicating that a possible speech signal has been detected. The interrupt generated in 114 may enable a microphone and codec in step 116. As more and more components are enabled then the power consumption of the mobile device may increase. In step 118 the method determines whether or not speech has been detected by the microphone. If no speech has been detected then the method may return to step 110 in which the microphone is disabled and the codec, which may be implemented in a digital signal processor, may also be disabled. Returning to step 118, if speech has been detected then a keyword detector may be enabled in step 120. In step 122 the keyword detector may determine whether a keyword has been detected. If a keyword is detected a further interrupt request may be generated in step 124. The further interrupt request may wake up a system processor and may enable an audio amplifier in step 126. Following the activation of the main system processor, the mobile device may be in a second mode of operation in step 128.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of operation of a mobile device having a first mode of operation and a further mode of operation,
the mobile device comprising a loudspeaker,
wherein the loudspeaker is configured to generate an electrical signal in response to an acoustic stimulus received from a non-stationary sound source;
the method comprising:
in the first mode of operation
detecting the electrical signal generated by the loudspeaker in response to the acoustic stimulus,
generating an activation signal in response to the detected electrical signal,
enabling the further mode of operation in response to the activation signal.

2. The method of claim 1
wherein the mobile device comprises a system processor and
wherein enabling the further mode of operation comprises activating the system processor in response to the activation signal.

3. The method of claim 1
wherein the mobile device comprises a digital signal processor and
wherein enabling the further mode of operation comprises activating the digital processor in response to the activation signal.

4. The method of claim 1
wherein the mobile device further comprises a microphone and
wherein enabling the further mode of operation comprises enabling the microphone in response to the activation signal.

5. The method of claim 4
wherein enabling the further mode of operation comprises detecting an electrical signal generated by the microphone in response to a further acoustic stimulus.

6. The method of claim 1
wherein the first mode of operation has a lower power consumption than the further mode of operation.

7. The method of claim 1
wherein the first mode of operation is a standby mode and wherein the power consumption of the standby mode is less than 1 mW.

8. A method of voice activation of a mobile device comprising the method of claim 1.

9. The method of claim 1:
wherein the non-stationary sound source is voice activity.

10. A mobile device having a first mode of operation and a further mode of operation, the mobile device comprising:
a loudspeaker configured to generate an electrical signal in response to an acoustic input signal received from a non-stationary sound source;
a controller having an input coupled to the loudspeaker;
wherein the controller is operable in a first mode of operation
to detect the electrical signal generated by the loudspeaker in response to the acoustic input signal, and
to generate an activation signal in response to the detected electrical signal; and
wherein the mobile device is operable to enable the further mode of operation in response to the activation signal.

11. The mobile device of claim 10 further comprising an audio amplifier switchably coupled to the loudspeaker and
wherein the controller is switchably coupled to the loudspeaker, wherein the controller is coupled to the loudspeaker in the first mode of operation and the audio amplifier is coupled to the loud speaker in the further mode of operation.

12. The mobile device of claim 11 further comprising
a codec coupled to the microphone and the controller and
wherein the controller is operable to enable the codec in response to the activation signal and
wherein the codec is operable to generate a further activation signal in response to the activation signal.

13. The mobile device of claim 10
wherein the controller further comprises a first level detector having a first response time and a second level detector having a second different response time;
wherein
   inputs of the first level detector and the second level detector are coupled to the loudspeaker in the first mode of operation,
   respective outputs of the first level detector and the second level detector are coupled to respective inputs of a comparator,
   the comparator output is coupled to an output of the controller.

14. The mobile device of claim 10 further comprising
a microphone switchably coupled to a power supply and
wherein the controller is configured to enable the microphone in response to the activation signal.

15. The mobile device of any of claim 10 further comprising
a system processor and
wherein the controller is operable to enable the system processor in response to the further activation signal.

16. The mobile device of claim 10 comprising at least one of a mobile phone, a laptop computer, and a tablet computer.

17. The mobile device of claim 10:
wherein the non-stationary sound source is voice activity.

* * * * *